(12) United States Patent
Krasny et al.

(10) Patent No.: US 8,094,762 B2
(45) Date of Patent: Jan. 10, 2012

(54) JOINT ESTIMATION OF MIMO CHANNELS AND NOISE CORRELATION FOR WIRELESS SYSTEMS WITH MULTIPLE RECEIVE ANTENNAS

(75) Inventors: Leonid Krasny, Cary, NC (US); Kambiz Zangi, Hill, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 922 days.

(21) Appl. No.: 12/114,516

(22) Filed: May 2, 2008

(65) Prior Publication Data
US 2009/0274253 A1     Nov. 5, 2009

(51) Int. Cl.
*H04B 1/10*     (2006.01)
*H04B 7/02*     (2006.01)

(52) U.S. Cl. .................. 375/347; 375/267; 375/350

(58) Field of Classification Search .......... 375/260, 375/267, 347, 349, 350
See application file for complete search history.

(56) References Cited

U.S. PATENT DOCUMENTS
2007/0049233 A1 *   3/2007   Wu et al. ................... 455/307

FOREIGN PATENT DOCUMENTS
EP     1530333 A1   5/2005
WO    WO 0161950 A1   8/2001

OTHER PUBLICATIONS

Zhang et al., "Analysis of pilot-symbol aided channel estimation for MIMO-OFDM systems", Communications, Circuits and Systems, vol. 1, Jun. 27-29, 2004, p. 299-303.
Written Opinion mailed Feb. 25, 2009 in corresponding PCT Application PCT/SE2008/050644.

* cited by examiner

*Primary Examiner* — David Lugo
(74) *Attorney, Agent, or Firm* — Nixon & Vanderhye P.C.

(57) ABSTRACT

A radio communication sent by a transmitter having M transmit antennas is received by a receiver having N receive antennas, where M is a positive integer greater than or equal to one and N is positive integer greater than one. Thus, N output signals, one for each receive antenna, are received. The signal transmitted from each transmit antenna includes predetermined pilot symbols known by the receiver and information symbols to be determined by the receiver. Weights for estimating each of M×N single-input/single-output channels between transmit and receive antennas are determined based on jointly processing pilot symbols received on all of the N receive antennas. The M×N channels are estimated based on the determined weights, and those estimated channels are used to determine the information symbols. An iterative procedure is used to estimate the M×N channels using a noise correlation matrix estimate and to estimate the noise correlation matrix using the M×N channel estimates.

16 Claims, 9 Drawing Sheets

JOINT ESTIMATION OF MIMO CHANNELS AND NOISE CORRELATION FOR WIRELESS SYSTEMS WITH MULTIPLE RECEIVE ANTENNAS

TECHNICAL FIELD

The technical field relates to radio communications, and in particular, to radio communications that use multiple input multiple output (MIMO) techniques.

BACKGROUND

In a typical radio communications system, user communications terminals referred to as user equipment units (UEs) communicate via a radio access network (RAN) with other networks like the Internet. The radio access network (RAN) covers a geographical area which is divided into cell areas, with each cell area being served by a base station, e.g., a radio base station (RBS), which in some networks is also called a "NodeB" or enhanced Node B. A cell is a geographical area where radio coverage is provided by the radio base station equipment at a base station site.

Third Generation (3G) cellular radio systems like Universal Mobile Telecommunications System (UMTS) operating in Wideband Code Division Multiple Access (WCDMA) use different types of radio channels including unscheduled radio channels and scheduled radio channels. Mixed voice/data, circuit/packet switched 3G systems evolved from voice-centric, circuit-switched second generation (2G) systems. Unscheduled channels, sometimes called dedicated channels, are usually allocated to only one user for the duration of a connection carrying information only associated with that one user. Scheduled channels are packet-switched channels over which packets for multiple user connections are carried. Fourth generation (4G) systems, like the Long Term Evolution (LTE) of UMTS and Worldwide Interoperability for Microwave Access (WiMAX), design the air interface based on packet data. Dedicated traffic channels are eliminated in favor of scheduled radio channels in order to simplify the system. Medium access control is thus migrating towards a request resource-grant resource paradigm. In response to actual requests to transmit data from and/or to a user equipment (UE) in the uplink and/or the downlink, the scheduler in the base station dynamically allocates radio resources to satisfy the quality of service requirements associated with the type of data traffic to be transmitted, and at the same time, tries to optimize the system capacity.

The IEEE 802.16 Working Group on Broadband Wireless Access Standards develops formal specifications for the global deployment of broadband Wireless Metropolitan Area Networks (MAN). Although the 802.16 family of standards is officially called WirelessMAN, it is often referred to as WiMAX. In general, 802.16 standardizes two aspects of the air interface: the physical layer (PHY) and the Media Access Control layer (MAC). For the physical layer, one mode of IEEE 802.16e uses scalable orthogonal frequency division multiple access (OFDMA) to support channel bandwidths of between 1.25 MHz and 20 MHz with up to 2048 sub-carriers. IEEE 802.16e supports adaptive modulation and coding, so that in good radio signal conditions, a highly efficient 64 QAM coding scheme can be used, whereas in poor radio signal conditions, a more robust BPSK coding mechanism can be used. In intermediate conditions, 16 QAM and QPSK can be employed. Other physical layer features include support for multiple-in-multiple-out (MIMO) antennas in order to provide good NLOS (Non-line-of-sight) characteristics (or higher bandwidth) and Hybrid automatic repeat request (HARQ) for good error correction performance. Multi-antenna techniques can significantly increase the data rates and reliability of a wireless communication system. The performance is in particular improved if both the transmitter and the receiver use multiple antennas resulting in a multiple-input multiple-output (MIMO) communication channel.

Thus, an important part of LTE and other wireless systems (e.g., IEEE 802.16e and 802.11n) is the support of MIMO antenna deployments and MIMO related processing techniques. A problem in MIMO systems is how to perform accurate channel estimation and noise correlation estimation of the MIMO channels. Assume a MIMO communications using M transmit antennas and N receive antennas, where M is an integer greater than or equal to 1 and N is an integer greater than 1. Channel estimation for the M×N single-input/single-output channels may be determined using an individual channel estimator to estimate each single-input/single-output channel from each transmit antenna to each receive antenna. In this case, each individual channel estimator uses one received signal at the receive antenna. Each such estimator works under the assumption that the noise at the receive antennas is a spatially uncorrelated white noise. But when the noise is not white and/or is correlated, then it must be accounted for in the channel estimation process. In fact, correlated interference at the receive antennas may be used to improve the quality of MIMO channel estimates.

In a cellular type radio system, the noise at the receive antennas includes thermal noise and other-cell interference. Although the focus in this case is on the latter component, the unqualified term "noise" includes both. FIG. 1 shows a simple example of a two base station MIMO system 10 in which a serving base station 12 with four transmit antennas transmits desired information including known pilot symbols to a user equipment (UE) 16 that has two receive antennas $A_{RX1}$ and $A_{RX2}$. Transmissions from another interfering base station 14 serving an adjacent cell are also received at the UE's antennas and interfere with the desired signals from base station 12. Although thermal noise present at the two UE antennas is a spatial-temporal white noise, the other cell interference is spatially highly correlated. In FIG. 1, this is represented by the two signals from the interfering base station 14 presenting essentially the same interference I at both of the receive antennas $A_{RX1}$ and $A_{RX2}$ at the UE. This spatial correlation can be exploited in the channel estimation process.

But correlated interference at the receive antennas is a problem when it comes to estimating the MIMO channels between a base station and a mobile radio station/user equipment (UE). The M×N single-input/single-output channel estimates depend on the received signals, the known pilot symbols, and also on the noise-plus-interference. The difficulty is that the noise-plus-interference is unknown and its estimate depends on the unknown M×N channel estimates. Hence, there is a "chicken and egg" problem where the M×N channel estimates cannot be determined without accurately knowing the noise-plus-interference, and the noise-plus-interference cannot be determined without accurately knowing the M×N channel estimates.

SUMMARY

A radio communication sent by a transmitter having M transmit antennas is received by a receiver having N receive antennas, where M is a positive integer greater than or equal to one and N is positive integer greater than one. Thus, the receiver receives N signals, one output for each receive antenna. The signal transmitted from each transmit antenna includes predetermined pilot symbols known by the receiver and information symbols to be determined by the receiver. Weights for estimating each of M×N single-input/single-output channels between transmit and receive antennas are determined based on jointly processing pilot symbols received on all of the N receive antennas. The M×N single-input/single-output channels are estimated based on the determined weights, and the estimated channels are used to determine the information symbols.

An iterative procedure is preferably used to estimate the M×N channels using a noise correlation matrix and to estimate the noise correlation matrix using the M×N channel estimates. One non-limiting example of such a procedure includes the following steps:

(a) determining a noise-plus-interference correlation matrix associated with the noise-plus-interference at the N receive antennas;

(b) determining weights for estimating each of M×N single-input/single-output channels between transmit and receive antennas based on pilot symbols received on all of the N receive antennas and on the noise-plus-interference correlation matrix;

(c) estimating the M×N single-input/single-output channels based on the determined weights;

(d) using the estimated channels, the pilot symbols, and the noise-plus-interference value to determine the information symbols;

(e) using the received signals, the pilot symbols, and the estimated channels to redetermine the noise-plus-interference correlation matrix; and (f) repeating steps (a)-(e) using the redetermined noise-plus-interference correlation matrix.

To start the procedure off, an initial estimate of the noise-plus-interference correlation matrix in step (a) may assume that the noise is white and the interference is spatially uncorrelated.

In one detailed example implementation, each of the M×N single-input/single-output channels is estimated based on the received signals at all the N receive antennas, a predetermined time-frequency correlation matrix of the M×N single-input/single-output channels, the pilot symbols received on all of the N receive antennas, and a spatial correlation matrix of the noise-plus-interference at the receive antennas. If the radio communication is transmitted using orthogonal frequency division multiplexing (OFDM), then the estimation of the M×N single-input/single-output channels is determined taking into account frequency, time, and space dimensions. The spatial correlation matrix of the noise-plus-interference at the receive antennas is determined based on average of an estimate of the noise-plus-interference at the receive antennas combined with an estimate of a complex conjugate of the noise-plus-interference at the receive antennas for multiple transmitted pilot symbols. The estimate of the noise-plus-interference at the receive antennas is determined based on the received signal at each receive antenna, the received pilot symbols, and the estimation of the M×N single-input/single-output channels.

The technology finds wide application to any MIMO communications. One non-limiting example is one or more receivers (base stations or user equipments (UEs)) in an LTE system.

DETAILED DESCRIPTION

In the following description, for purposes of explanation and non-limitation, specific details are set forth, such as particular nodes, functional entities, techniques, protocols, standards, etc. in order to provide an understanding of the described technology. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), programmable logic arrays, and/or using one or more digital signal processors (DSPs).

It will be apparent to one skilled in the art that other embodiments may be practiced apart from the specific details disclosed below. The technology is sometimes described making reference to an LTE-based system in order to provide an example and non-limiting context for explanation. But this technology may be used in any modern wireless communications system that employs multiple receive antennas.

The description assumes, for example purposes, the use of pilot-assisted channel estimation in an LTE system that is OFDM based. The transmitter transmits a number of known predetermined symbols from each transmit antenna so that the receiver can estimate the MIMO channels from that transmit antenna to each receive antenna. In this non-limiting example, the MIMO channels and a noise+interference correlation matrix are estimated based on the known pilot symbols embedded within each "chunk," where a chunk is defined as a block of $N_t$ consecutive orthogonal frequency division multiplex (OFDM) symbols (along the time axis) and $N_t$ consecutive sub-carriers (along the frequency axis), $N_t$ is a positive integer.

Figure 2:
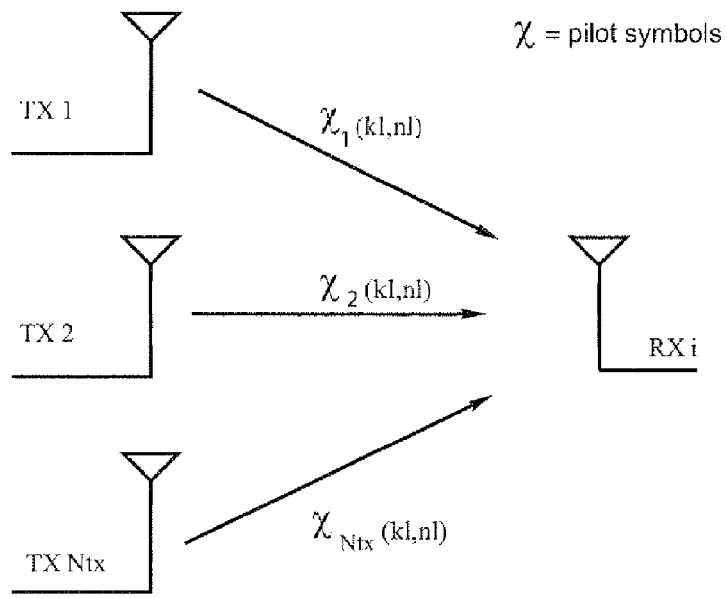
FIG. 2 illustrates an example, non-limiting MIMO radio communication system that shows pilot symbols transmitted from multiple transmit antennas to a receive antenna.

Referring to FIG. 2 which shows $N_{tx}$ parallel transmit antennas transmitting $N_{tx}$ pilot signals $X_j$ to each receive antenna, where j is a space dimension index $1, 2, \ldots, N_{tx}$. Let $\{X_j(k_l, n_l)\}_{l=1}^{L}$ denote the subset of resource elements of a chunk transmitted from transmit antenna j that are devoted to pilots, i.e., L (L is the number of pilot symbols) pilot symbols will be transmitted during each chunk from each transmit antenna identified with index j. The subset of indexes $\{k_l, n_l\}_{l=1}^{L}$ for each transmit antenna is determined by the predetermined pilot symbol pattern in the frequency-time domain, where k is a frequency index and n is a time index. Similarly, let $\{Y_{i,j}(k_l, n_l)\}_{l=1}^{L}$ denote the received signal at the i-th receive antenna that indexes the pilots $\{X_j(k_l, n_l)\}_{l=1}^{L}$.

Assume that the pilot symbols and data symbols are orthogonal at transmit antennas, i.e., if $X_j(k, n)$ is a pilot symbol on the j-th transmit antenna, then $X_{ji}(k, n)=0$ for all $j_i \neq j$. From this, the relationship between the receive signals $Y_{i,j}(k_l, n_l)$ and the transmitted pilots $\{X_j(k_l, n_l)\}_{l=1}^{L}$ can be described by the following expression:

$$Y_{i,j}(k_l, n_l) = H_{i,j}(k_l, n_l) \times X_j(k_l, n_l) + N_i(k_l, n_l), 1 \leq l \leq K, \quad (1)$$

where $H_{i,j}(k_l, n_l)$ is the time-varying frequency response of the MIMO channel between the j-th transmit antenna and the i-th receive antenna corresponding to the k-th frequency OFDM sub-carrier at time n*T (where T is a real time sampling interval). An individual MIMO channel in this context is a single-input/single-output channel. $N_i(k, n)$ is the noise+interference present at the i-th receive antenna which has a correlation function $R_{i,ii}(k, k_p) = E\{N_i(k, n) N^*_{ii}(k_p, n)\}$, where * denotes complex conjugate, k and $k_p$ are indices corresponding the k-th and the $k_p$-th sub-carriers, and E{ } is a symbol of the statistical averaging.

The goal is to determine the estimates of the individual MIMO channels $H_{i,j}(k,n)$ and an estimate of the noise correlation function $R_{i,ii}(k_p, k_l)$ based on observations of the receive signals $\{Y_{i,j}(k_l, n_l)\}_{l=1}^{L}$ and a priori knowledge of the transmitted pilot symbols $\{X_j(k_l, n_l)\}_{l=1}^{L}$.

Before describing the technology for jointly estimating the MIMO channels $H_{i,j}(k_l, n_l)$ and the noise+interference correlation $R_{i,ii}(k, k_p)$ that exploits the interference correlation among different receive antennas and improves the MIMO channel estimation accuracy, a brief review of single MIMO channel estimation is provided. An estimate $\hat{H}_{i,j}(k,n)$ of a single-input/single-output MIMO channel $H_{i,j}(k, n)$ from the one transmit antenna to one receive antenna may be expressed as:

$$\hat{H}_{i,j}(k, n) = \sum_{l=1}^{L} w_j(k, n; k_l, n_l) Y_{i,j}(k_l, n_l). \quad (2)$$

In equation (2), $w_j(k, n; k_l, n_l)$ are the coefficients of the Wiener filter which may computed as follows:

$$w_j(k, n; k_l, n_l) = \sum_{p=1}^{L} K_H(k, n; k_p, n_p) X_j(k_p, n_p) B_j^{-1}(k_p, n_p; k_l, n_l), \quad (3)$$

where $K_H(k, n; k_p, n_p)$ is a time-frequency correlation matrix (which is predetermined) that defines the statistical properties of the single-input/single-output MIMO channel $H_{i,j}(k, n)$ and is expressed as follows:

$$K_H(k, n; k_p, n_p) = E\{H_{i,j}(k, n) H_{i,j}^*(k_p, n_p)\} \quad (4)$$

$B_j^{-1}(k_p, n_p; k_l, n_l)$ is the inverse of matrix $B_j$ which is expressed as:

$$B_j(k_p, n_p; k_l, n_l) = \quad (5)$$
$$N_0 \delta(k_p - k_l) \delta(n_p - n_l) + X_j^*(k_p, n_p) K_H(k_p, n_p; k_l, n_l) X_j(k_l, n_l)$$

where $N_0$ is the spectral density of the noise+interference which is expressed as:

$$N_0 = \frac{1}{L} \sum_{l=1}^{L} R_{i,i}(k_l, k_l).$$

Figure 3:
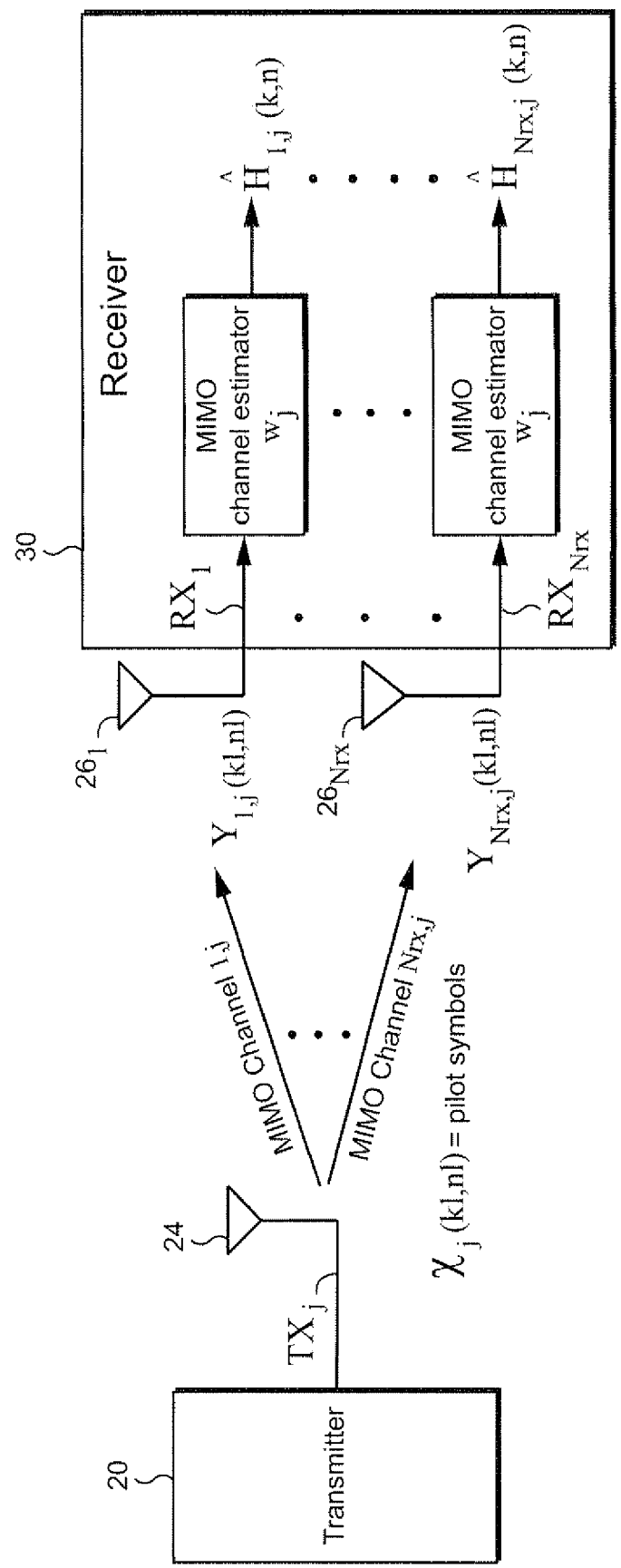
FIG. 3 illustrates an example, non-limiting MIMO radio communication system where the receiver uses multiple individual MIMO channel estimators.

FIG. 3 illustrates an example, non-limiting MIMO radio communication system where the receiver uses multiple individual MIMO channel estimators to estimate each single-input/single-output MIMO channel. A transmitter 20 include a single transmit antenna $TX_j$ 24 that sends pilot symbols $X_j(kl, nl)$ over each of Nrx single-input/single-output MIMO channels from the transmit antenna to the Nrx receive antennas $26_l$-$26_{Nrx}$. Each received signal $Y_{i,j}(kl,nl)$–$Y_{Nrx,j}(kl,nl)$ is processed by its own individual MIMO channel estimator $w_j$ to produce its MIMO channel estimate $\hat{H}_{i,j}(k,n)$–$\hat{H}_{Nrx,j}(k,n)$. Thus, to estimate the channel between the j-th transmit antenna and the i-th receive antenna, each estimator processes just the one signal $Y_{i,j}(k_l, n_l)$ received at the i-th receive antenna. This approach reflects the fact that the individual MIMO channel estimator estimators have been synthesized under an assumption that the noise+interference $N_i(k, n)$ at the receive antennas is a spatially uncorrelated white noise with variance $N_0$. But as already explained above, even though the thermal noise is a spatial-temporal white noise, the other-cell interference may be spatially highly correlated. The channel estimation can be improved if one takes into account the correlated spatial properties of the noise at the receive antennas.

To achieve that improvement, the problem is how to actually determine the covariance of the noise+interference using the pilots and the receive signal. The received signal over the pilot symbols may not be used to estimate the covariance of the noise+interference because the received signal $$Y_{i,j}(k_l, n_l) = H_{i,j}(k_l, n_l) \times X_j(k_l, n_l) + N_i(k_l, n_l)$$

contains the noise+interference term as an unknown. Although the pilot symbol term $X_j(k_l, n_l)$ is known, the channel estimate $H_{i,j}(k_l, n_l)$ is also an unknown. One could propose just calculating: $Y_{i,j}(k_l, nl) - H_{i,j}(k_l, n_l) \times X_j(k_l, n_l)$, as the noise+interference. But to perform this calculation, $H_{i,j}(k_l, n_l)$ must be known, which it is not.

This chicken and egg problem is solved using an iterative procedure that toggles between estimating the channel and estimating the covariance of noise+interference. This iterative procedure improves both the channel estimation because the proposed channel estimator takes into account the spatial correlation of the noise+interference and the estimation of the noise+interference correlation because it is based on improved channel estimation.

The technology in this case offers an enhanced channel estimator that takes into account the spatial properties of the noise-plus-interference at the receive antennas. Unlike the individual channel estimators in FIG. 3, each MIMO channel estimate $\hat{H}_{i,j}(k,n)$ is advantageously calculated based on joint observation and processing of all of the received signals $Y_i(k_l, n_l)=\{Y_{i,l}(k_l, n_l), \ldots, Y_{i,Ntrx}(k_l, n_l)\}$ on all the receive antennas. The proposed channel estimation algorithm can be expressed as:

$$\hat{H}_{i,j}(k, n) = \sum_{i_1=1}^{Nrx} \sum_{l+1}^{L} W_{i,i_1}^{(j)}(k, n; k_l, n_l) Y_{i_1,j}(k_l, n_l) \quad (6)$$

where the weighting coefficients $W(k, n; k_l, n_l)$ are computed from the following system of linear equations:

$$\sum_{i_1=1}^{Nrx} \sum_{l+1}^{L} A_{i_2,i_1}(k_p, n_p; k_l, n_l) W_{i,i_1}^{(j)}(k, n; k_l, n_l) = \quad (7)$$

$$X_j(k_p, n_p) K_H(k, n; k_p, n_p) \delta(i_2 - i)$$

where $\delta(i_2-i)$ is the Kroneker symbol ($\delta(x)=1$, if $x=0$, and $\delta(x)=0$, if $x\neq 0$), and the coefficients $A_{i_2,i_1}(k_p, n_p; k_l, n_l)$ at the system of equations Eq. (7) are given by:

$$A_{i_2,i_1}(k_p, n_p; k_l, n_l) == R_{i_2,i_1}(k_p, k_l) \delta(n_p - n_l) + \quad (8)$$

$$X_j^*(k_p, n_p) K_H(k_p, np; k_l, n_l) \delta(i_2 - i_1) X_j(k_l, n_l)$$

It is assumed that MIMO channels between different receive antennas are uncorrelated (see the Kroneker symbol at the right part of Eq. (8)).

Figure 4:
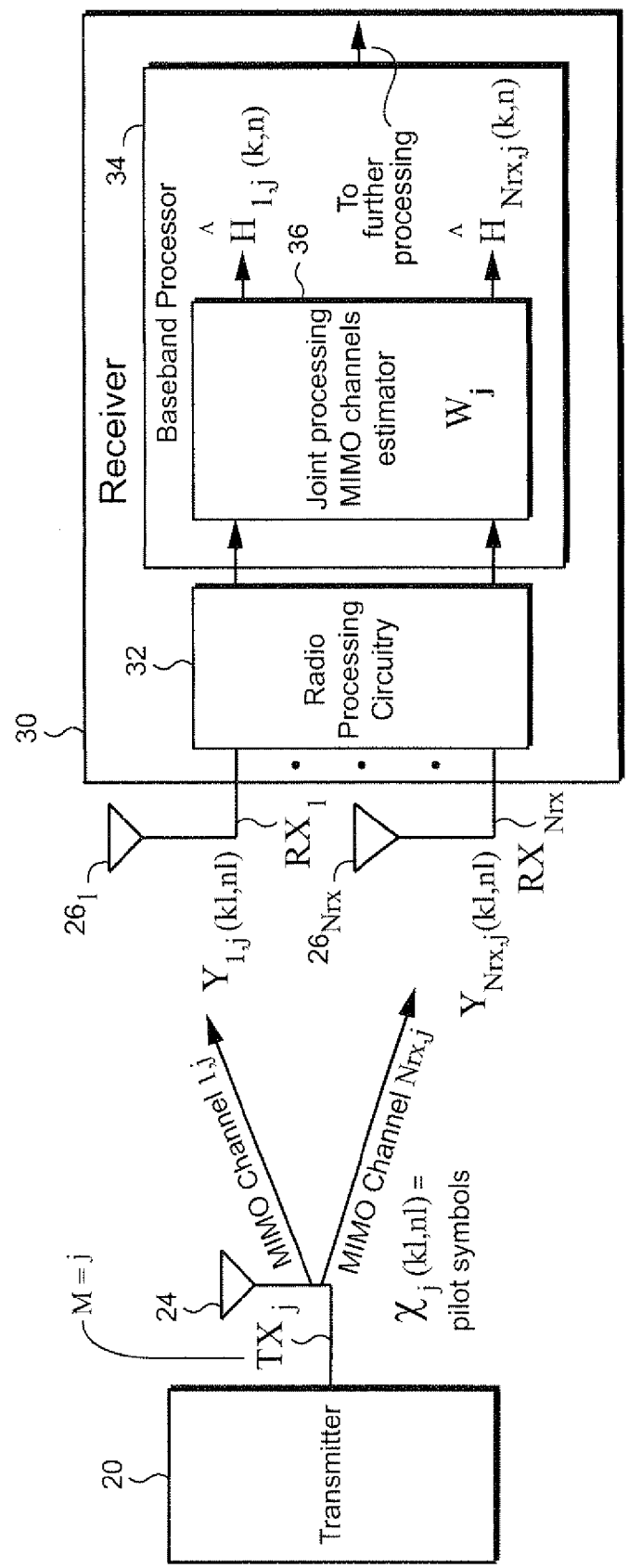
FIG. 4 illustrates an example, non-limiting MIMO radio communication system where the receiver uses a combined MIMO channels estimator.

FIG. 4 illustrates an example, non-limiting MIMO radio communication system where the receiver uses joint processing to estimate the MIMO channels. Like reference numerals are used from FIG. 3 to refer to like elements. The receiver 30 includes radio processing circuitry 32 that converts the received signals from the antennas $26_l$-$26_{Ntrx}$ to baseband frequency and provides the baseband signals to a baseband processor 34. The baseband processor 34 includes, among other things, a joint processing MIMO channels estimator 36 that estimates each individual MIMO channel $\hat{H}_{i,j}(k,n)$ by jointly processing the receive signals from all receive antennas. The joint processing includes operations based on equations (6)-(9). Note that when the noise+interference at the receive antennas is white and spatially uncorrelated, the matrix $W_j$ with elements $W_{i,i_1}^{(j)}(k, n; k_l, n_l)$ becomes diagonal and equation (6) reduces to equation (2).

To implement the combined MIMO channels estimator 36 requires a knowledge of the spatial correlation matrix $R_{i,i_1}(k_p, k_l)$ of the noise+interference at the receive antennas (see equation (8)). This information can be obtained based on the following estimate of the spatial correlation matrix $R_{i,i_1}(k_p, k_l)$:

$$\hat{R}_{i,i_1}(k_p, k_m) = \frac{1}{N_{tx} L_t} \quad (9)$$

$$\sum_{j=1}^{N_{tx}} \sum_{i=1}^{L_t} [Y_{i,j}(k_p, n_l) - X_j(k_p, n_l) \hat{H}_{i,j}(k_p, n_l)] \times \times [Y_{i_1,j}^*(k_m, n_l) -$$

$$X_j^*(k_m, n_l) \hat{H}_{i_1,j}^*(k_m, n_l)].$$

which determines a long-term average of the receive signals over $L_t$ time sample intervals and $N_{tx}$ transmit antennas. Long term averaging over time in equation (9) can be performed using block averaging or running averaging. This procedure is suitable for systems having continuous pilots, e.g., LTE.

Equations (6) and (9) may be used in an iterative algorithm for joint estimation of the MIMO channels and the noise+ interference correlation matrix. The initial channel estimation can be performed by assuming in equation (6) that noise is white and spatially uncorrelated, i.e., $R_{i,i_1}(k_p,k_l)=N_0\delta(k_p-k_l)\delta(i-i_l)$. After calculating the initial channel estimates $\hat{H}_{i,j}(k_l, n_l)$ using equation (6), they can be used to estimate the noise-plus-interference correlation matrix $R_{i,i_1}(k_p, k_l)$. The estimated noise-plus-interference correlation matrix is then used in equation (6) to calculate another set of more accurate MIMO channel estimates. For example and not limitation, three iterations may be used to estimate the MIMO channels and noise correlation matrix with sufficiently high accuracy. Of course, more or less iterations may be performed.

Figure 5:
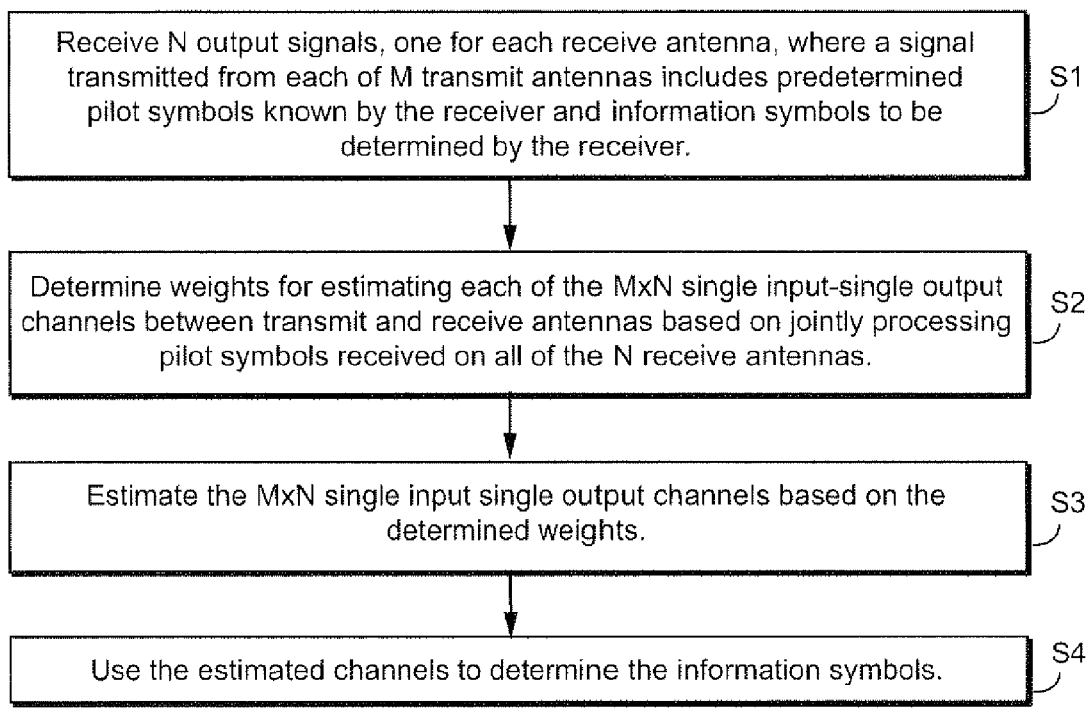
FIG. 5 illustrates a flowchart showing example, non-limiting steps for using a combined MIMO channels estimator to jointly estimate the MIMO channels.

FIG. 5 illustrates a flowchart showing example, non-limiting steps for using a combined MIMO channels estimator to jointly estimate the MIMO channels. A radio communication sent by a transmitter having M transmit antennas is received by a receiver having N receive antennas (step S1). M is a positive integer greater than or equal to one, and N is positive integer greater than one. Thus, the receiver receives N signals, one output for each receive antenna. The signal transmitted from each transmit antenna includes predetermined pilot symbols known by the receiver and information symbols to be determined by the receiver. Weights for estimating each of M×N single-input/single-output channels between transmit and receive antennas are determined based on jointly processing pilot symbols received on all of the N receive antennas (step S2). The M×N single-input/single-output channels are estimated based on the determined weights (step S3), and the estimated channels are used to determine the information symbols (step S4).

Figure 6:
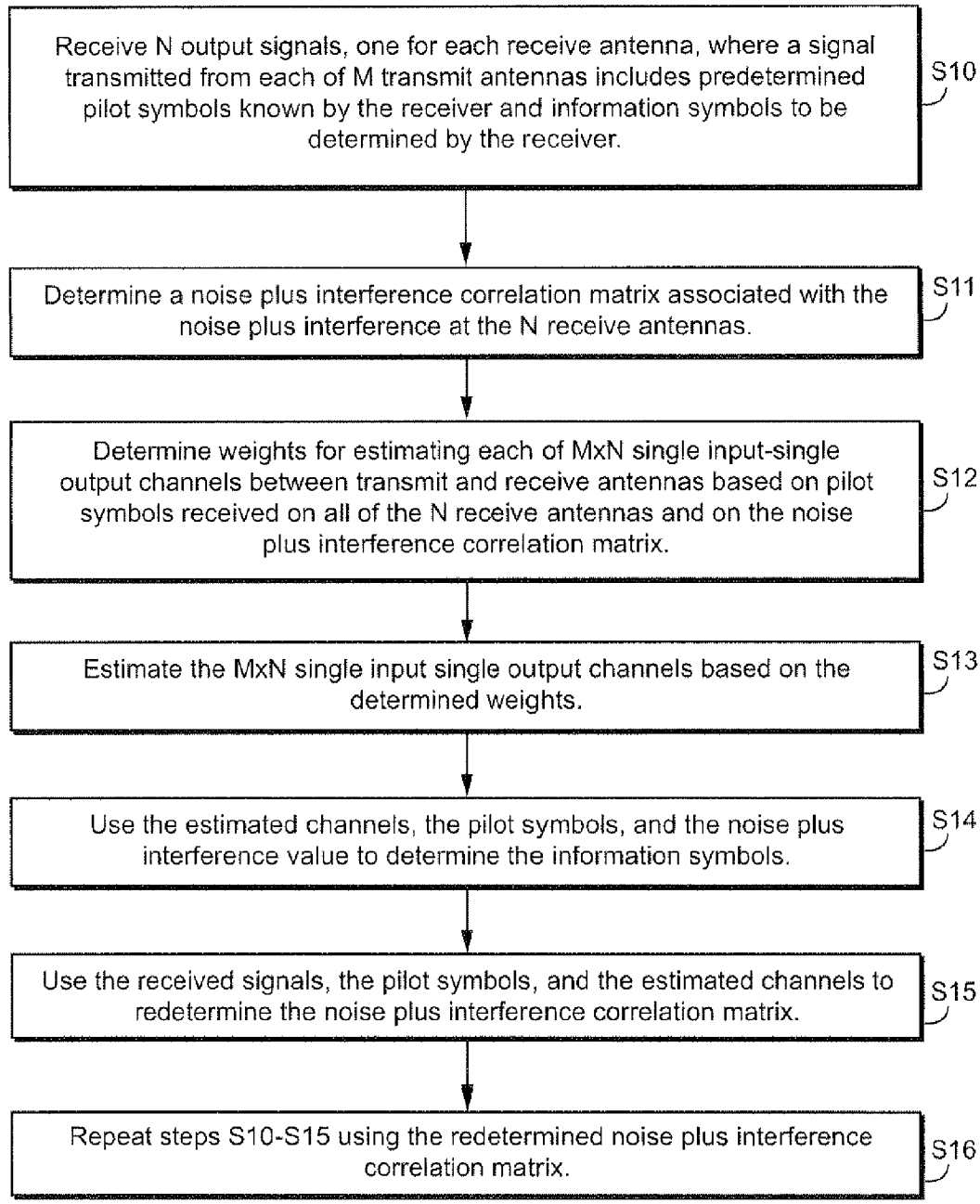
FIG. 6 illustrates a flowchart showing example, non-limiting steps for an iterative process to estimate the MIMO channels and the noise-plus-interference at the receive antennas.

FIG. 6 illustrates a flowchart showing example, non-limiting steps for an iterative process to estimate the MIMO channels and the noise-plus-interference matrix at the receive antennas. A radio communication sent by a transmitter having M transmit antennas is received by a receiver having N receive antennas (step S10). M is a positive integer greater than or equal to one, and N is positive integer greater than one. Thus, the receiver receives N signals, one output for each receive antenna. The signal transmitted from each transmit antenna includes predetermined pilot symbols known by the receiver and information symbols to be determined by the receiver. A noise-plus-interference correlation matrix associated with the noise-plus-interference at the N receive antennas is determined (step S11). Weights are determined for estimating each of M×N single-input/single-output channels between transmit and receive antennas based on pilot symbols received on all of the N receive antennas and on the noise-plus-interference correlation matrix (step S12). The M×N single-input/single-output channels are estimated based on the determined weights (step S13). The estimated channels, the pilot symbols, and the noise-plus-interference matrix are used to determine the information symbols (step S14). The received signals, the pilot symbols, and the estimated channels to are used redetermine the noise-plus-interference correlation matrix (step S15). Steps S10-S15 are repeated using the redetermined noise-plus-interference correlation matrix (step S16).

Figure 1:
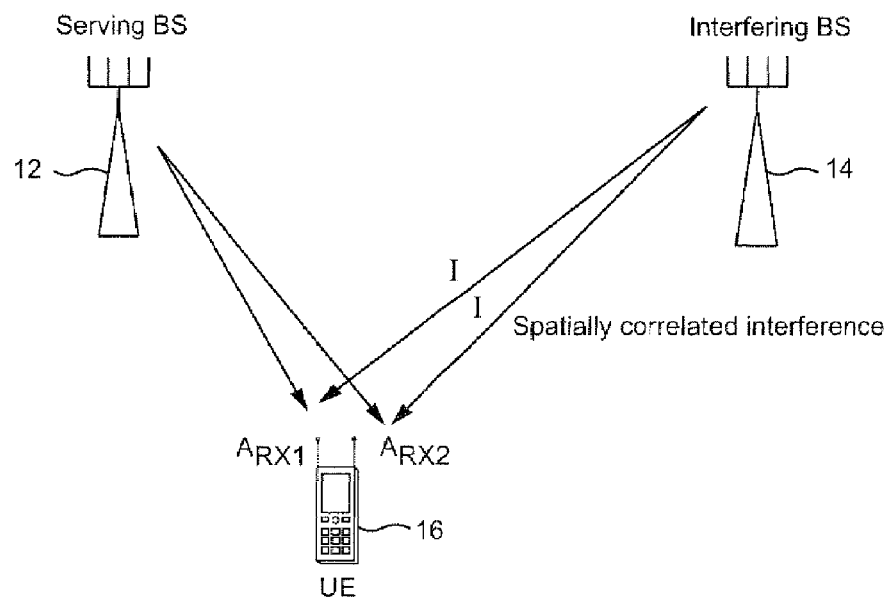
FIG. 1 illustrates an example, non-limiting MIMO radio communication system that shows spatially correlated interference.
Figure 7:
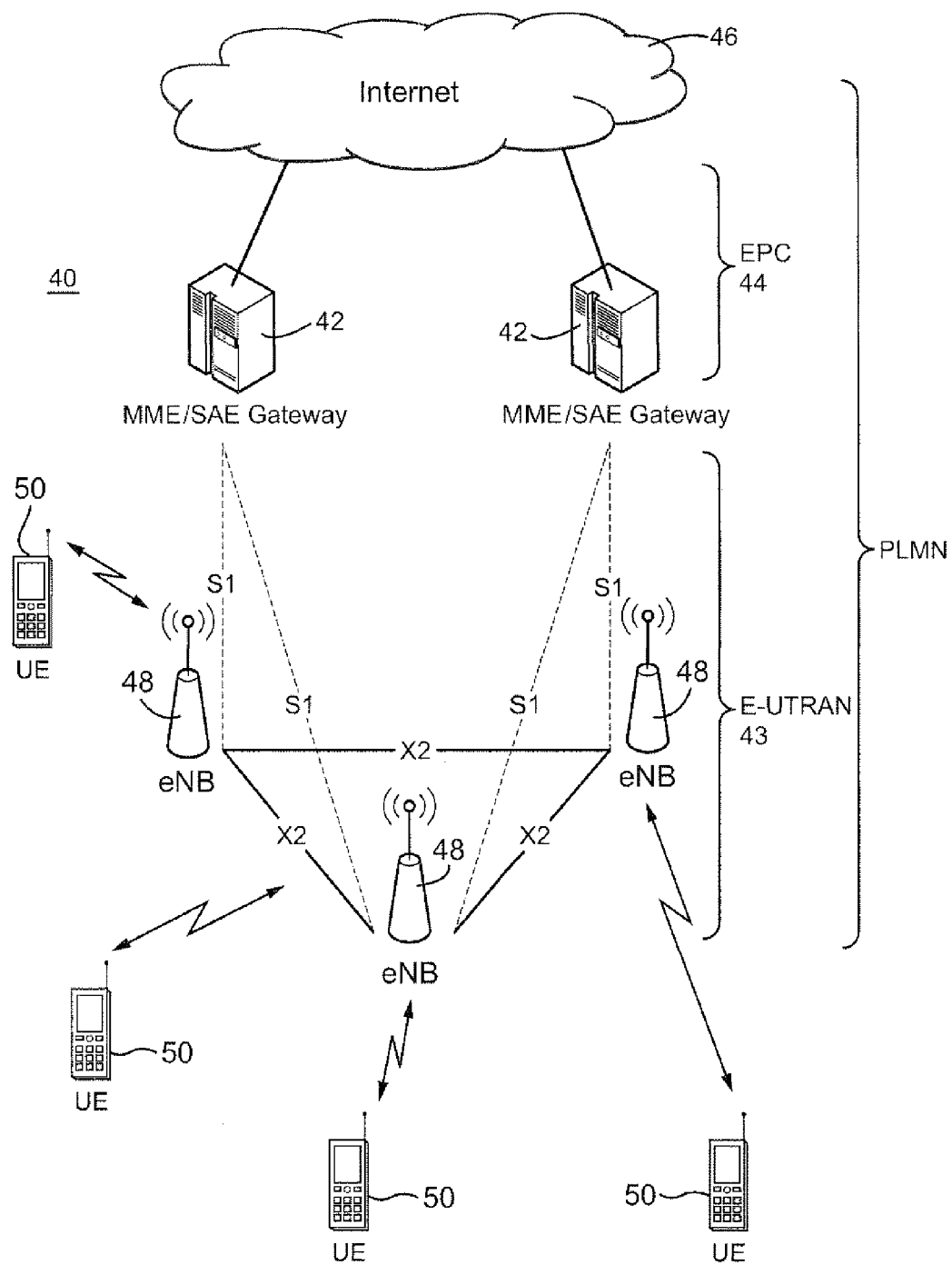
FIG. 7 is a function block diagram of an example LTE mobile radio communication system in which the technology of this application may be advantageously employed.

FIG. 7 illustrates a non-limiting example of an LTE type mobile communications system 40 in which the joint estimation of MIMO channels and noise-plus-correlation matrix for OFDM systems with multiple receive antennas technology may be used. An E-UTRAN 43 includes E-UTRAN NodeBs (eNBs) 48 that provide E-UTRA user plane and control plane protocol terminations towards the user equipment (UE) terminals 50 over a radio interface. An eNB is sometimes more generally referred to as a base station, and a UE is sometimes referred to as a mobile radio terminal or a mobile station. As shown in FIG. 1, the base stations are interconnected with each other by an X2 interface. The base stations are also connected by an S1 interface to an Evolved Packet Core (EPC) 44 which includes a Mobility Management Entity (MME) and to a System Architecture Evolution (SAE) Gateway. The MME/SAE Gateway is shown as a single node 42 in this example and is analogous in many ways to an SGSN/GGSN gateway in UMTS and in GSM/EDGE. The S1 interface supports a many-to-many relation between MMEs/SAE Gateways and eNBs. The E-UTRAN 43 and EPC 44 together form a Public Land Mobile Network (PLMN). The MMEs/SAE Gateways 42 are connected to directly or indirectly to the Internet 46 and to other networks. The joint estimation of MIMO channels and noise-plus-correlation matrix may be used in the receiver one or more of the UEs 50 or in the receiver of one or more of the eNBs 48.

The performance of the joint estimation of MIMO channels and noise correlation has been tested by the inventors in LTE-based simulations some of which are now described. The simulation assumptions and parameters are as follows. First, an eNB base station has Ntx=4 transmit antennas and a mobile terminal (UE) has Nrx=2 or 4 receive antennas. Second, transmit antennas are grouped into two clusters, and the antennas in each cluster are placed close to each other (e.g., λ/2). As a result, the transmit antennas within each cluster are highly spatially correlated. The clusters are placed far apart so that the transmit antennas from different clusters are approximately independent from each other. Third, the downlink MIMO channels from the base station to the UE are modeled as random realizations of the dispersive 3GPP Typical Urban channel from the 3GPP Spatial Channel Model. Fourth, a chunk is defined as a block of 10 consecutive OFDM symbols (along the time axis) and 12 consecutive sub-carriers (along the frequency axis) with 15 kHz separation between sub-carriers. Fifth, each transmit antenna transmits 4 pilots per chunk with double power. Sixth, the modulation is 16 QAM. Seventh, estimation of the noise correlation is based on block averaging over 10 TTI'S. Eighth, the number of iterations is 3.

Figure 8:
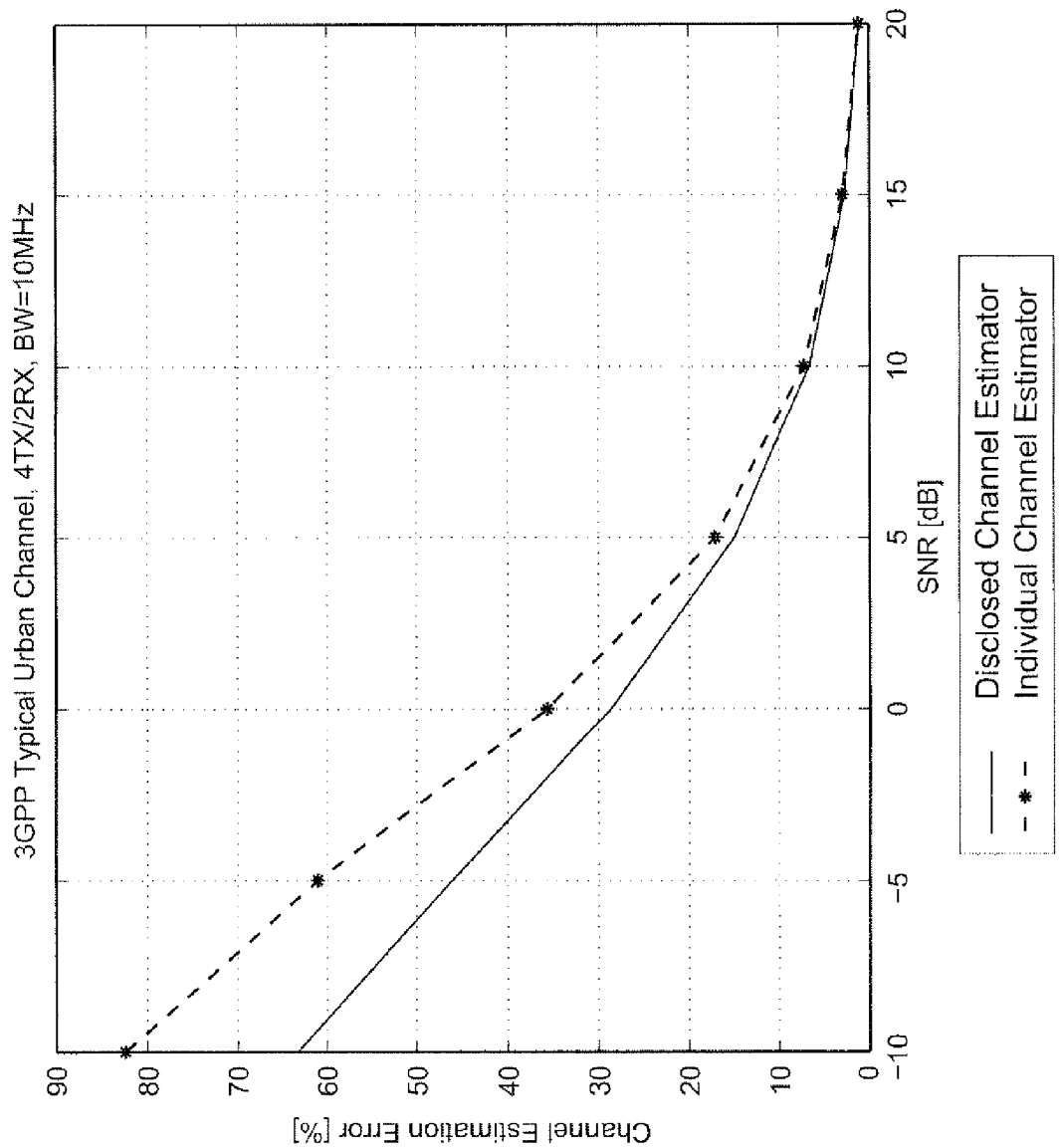
FIG. 8 is a graph illustrating channel estimation error against signal to interference ratio (SNR) for the disclosed example combined MIMO channels estimator and for an individual MIMO channel estimator.
Figure 9:
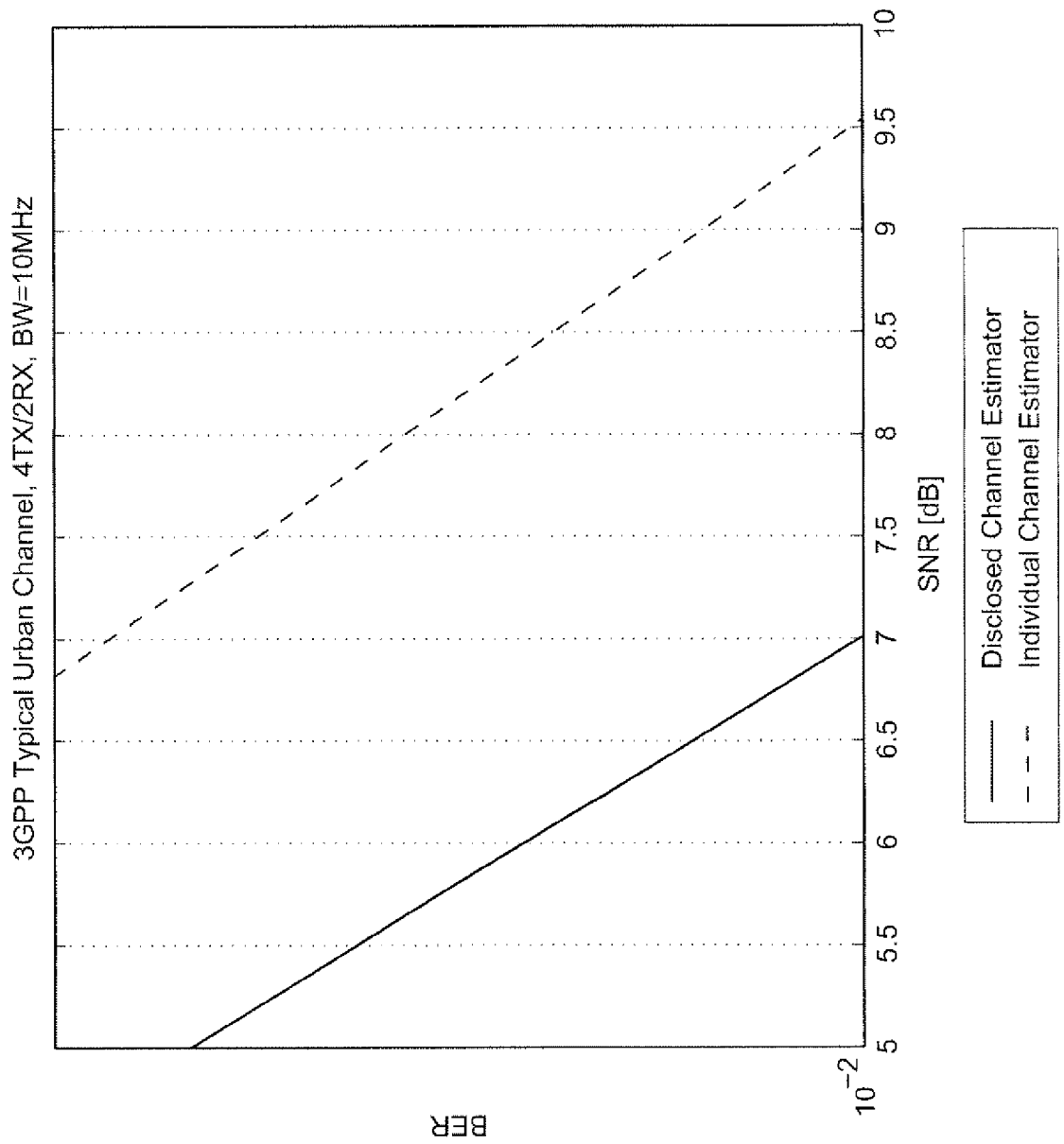
FIG. 9 is a graph illustrating bit error rate (BER) against signal to interference ratio (SNR) for the disclosed example combined MIMO channels estimator and for an individual MIMO channel estimator for a four transmit antennas-two receive antennas MIMO communications system.
Figure 10:
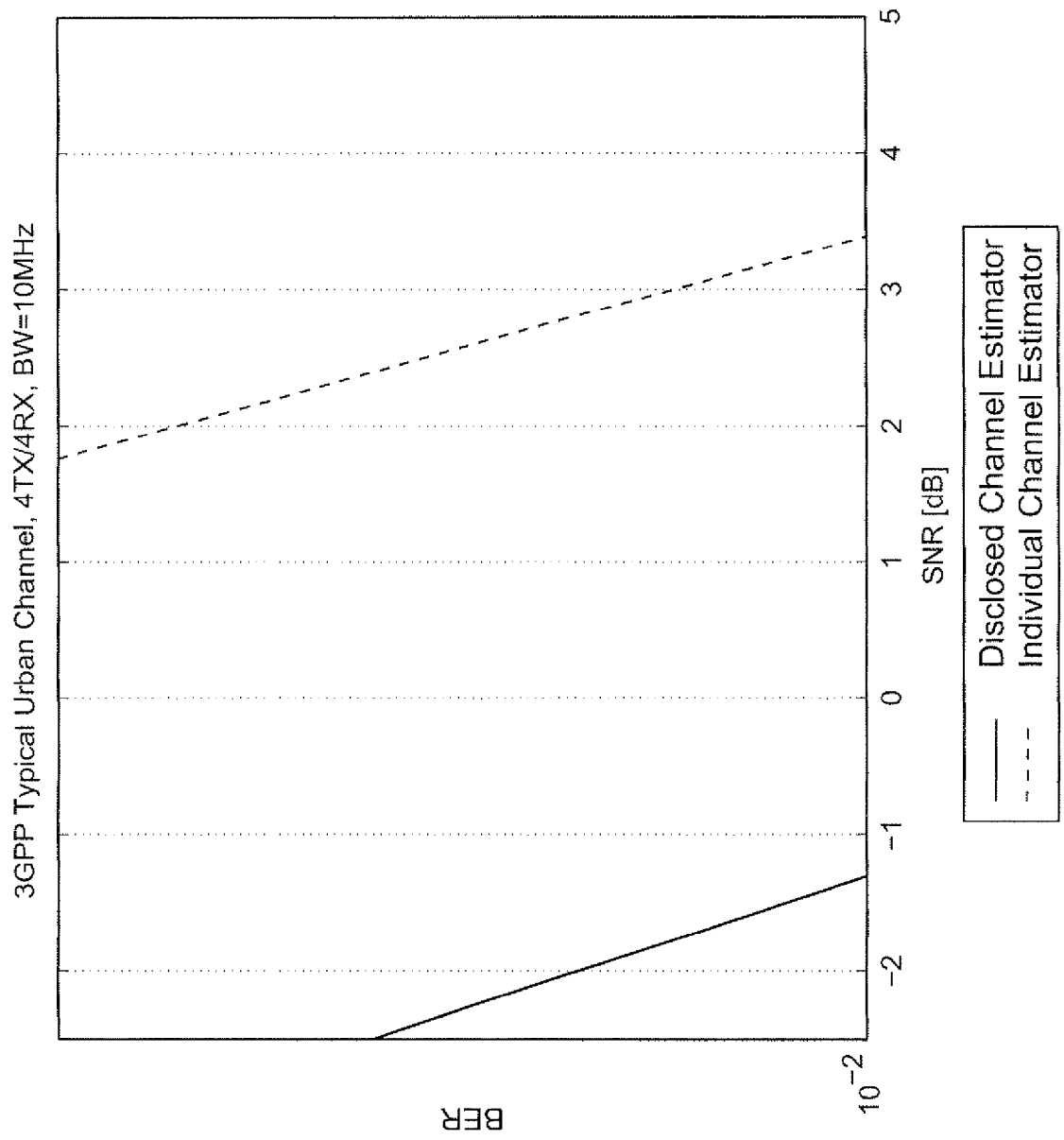
FIG. 10 is a graph illustrating bit error rate (BER) against signal to interference ratio (SNR) for the disclosed example combined MIMO channels estimator and for an individual MIMO channel estimator for a four transmit antennas-four receive antennas MIMO communications system.

In FIG. 8, the channel estimation error is plotted as a function of the signal-to-noise power ratio (SNR) at the UE receiver for a base station transmitter using four transmit antennas and a UE receiver using two receive antennas. At low-to-moderate SNR, the combined MIMO channel estimator 36 gains 5 dB compared to the individual MIMO estimators shown in FIG. 3. FIGS. 9 and 10 show the bit error rate (BER) corresponding to the combined MIMO channel estimator 36 and the individual MIMO estimators shown in FIG. 3 relative to SNR. With 16 QAM modulation and two receive antennas (FIG. 9) at a BER=1%, the combined MIMO channel estimator 36 outperforms the individual MIMO estimators shown in FIG. 3 by 2.5 dB. For a MIMO system with four receive antennas (FIG. 10), the relative gain is even greater exceeding 4 dB.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method for receiving a radio communication sent by a transmitter having M transmit antennas to a receiver having N receive antennas, where M is a positive integer greater than or equal to one and N is positive integer greater than one, the method comprising:
   (a) receiving N output signals, one for each receive antenna, where a signal transmitted from each of M transmit antennas includes predetermined pilot symbols known by the receiver and information symbols to be determined by the receiver;
   (b) determining a noise-plus-interference correlation matrix associated with the noise-plus-interference at the N receive antennas;
   (c) determining weights of an adaptive filter based on jointly processing pilot symbols received on the N receive antennas and the noise-plus-interference correlation matrix;
   (d) estimating each of M×N single-input/single-output channels between transmit and receive antennas based on the determined weights of the adaptive filter;
   (e) using the estimated channels, the pilot symbols, and the noise-plus-interference matrix to determine the information symbols;
   (f) using the received signals, the pilot symbols, and the estimated channels to update the noise-plus-interference correlation matrix; and
   (g) repeating steps (b)-(e) using the updated noise-plus-interference correlation matrix, wherein the adaptive filter changes using the updated noise-plus-interference correlation matrix.

2. The method in claim 1 implemented in one or more receivers in an LTE system.

3. The method in claim 1 implemented in one or more base station receivers or in one or more user equipments (UEs).

4. The method in claim 1, wherein an initial determination of the noise-plus-interference correlation matrix in step (b) assumes that the noise is white and the interference is spatially uncorrelated.

5. The method in claim 1, wherein each of the M×N single-input/single-output channels is estimated based on the received signals at all the N receive antennas, a predetermined time-frequency correlation matrix of the M×N single-input/single-output channels, the pilot symbols received on all of the N receive antennas, and a spatial correlation matrix of the noise-plus-interference at the receive antennas.

6. The method in claim 5, wherein the radio communication is transmitted using orthogonal frequency division multiplexing (OFDM), and
   wherein the estimation of the M×N single-input/single-output channels is determined taking into account frequency, time, and space dimensions.

7. The method in claim 5, wherein the spatial correlation matrix of the noise-plus-interference at the receive antennas is determined based on an average of an estimate of the noise-plus-interference at the receive antennas combined with an estimate of a complex conjugate of the noise-plus-interference at the receive antennas for multiple transmitted pilot symbols.

8. The method in claim 7, wherein the determination of the noise-plus-interference at the receive antennas is based on the received signal at each receive antenna, the received pilot symbols, and the estimation of the M×N single-input/single-output channels.

9. Receiving apparatus for receiving a radio communication sent by a transmitter having M transmit antennas, where M is a positive integer greater than or equal to one, comprising:
   N receive antennas, where N is a positive integer greater than one;
   radio processing circuitry for receiving N output signals, one for each receive antenna, where a signal transmitted from each of M transmit antennas includes predetermined pilot symbols known by the receiver and information symbols to be determined by the receiver; and
   baseband processing circuitry configured to:
   (a) determine a noise-plus-interference correlation matrix associated with noise-plus-interference at the N receive antennas;
   (b) determine weights of an adaptive filter based on jointly processing pilot symbols received on the N receive antennas and the noise-plus-interference correlation matrix;
   (c) estimate each of M×N single-input/single-output channels between transmit and receive antennas based on the determined weights of the adaptive filter;
   (d) use the estimated channels, the pilot symbols, and the noise-plus-interference correlation matrix to determine the information symbols;
   (e) use the received signals, the pilot symbols, and the estimated channels to update the noise-plus-interference correlation matrix, and
   (f) repeat (a)-(d) using the updated noise-plus-interference correlation matrix, wherein the adaptive filter changes using the updated noise-plus-interference correlation matrix.

10. The receiving apparatus in claim 9 implemented in one or more receivers in an LTE system.

11. The receiving apparatus in claim 9 implemented in one or more base station receivers or in one or more user equipments (UEs).

12. The receiving apparatus in claim 9, wherein an initial determination of the noise-plus-interference correlation matrix in (a) assumes that the noise is white and the interference is spatially uncorrelated.

13. The receiving apparatus in claim 9, wherein the estimate of each of the M×N single-input/single-output channels is based on the received signals at all the N receive antennas, a predetermined time-frequency correlation matrix of the M×N single-input/single-output channels, the pilot symbols received on all of the N receive antennas, and a spatial correlation matrix of the noise-plus-interference at the receive antennas.

14. The receiving apparatus method in claim 13, wherein the radio communication is transmitted using orthogonal frequency division multiplexing (OFDM), and
   wherein the estimation of the M×N single-input/single-output channels takes into account frequency, time, and space dimensions.

15. The receiving apparatus in claim 13, wherein the spatial correlation matrix of the noise-plus-interference at the receive antennas is based on an average of an estimate of the noise-plus-interference at the receive antennas combined with an estimate of a complex conjugate of the noise-plus-interference at the receive antennas for multiple transmitted pilot symbols.

16. The receiving apparatus in claim 15, wherein the determination of the noise-plus-interference at the receive antennas is based on the received signal at each receive antenna, the received pilot symbols, and the estimation of the M×N single-input/single-output channels.

* * * * *

UNITED STATES PATENT AND TRADEMARK OFFICE
CERTIFICATE OF CORRECTION

PATENT NO. : 8,094,762 B2  
APPLICATION NO. : 12/114516  
DATED : January 10, 2012  
INVENTOR(S) : Krasny et al.

It is certified that error appears in the above-identified patent and that said Letters Patent is hereby corrected as shown below:

On the Title Page, in Item (75), under "Inventors", in Column 1, Line 2, delete "Hill," and insert -- Chapel Hill, --, therefor.

In the Specifications:

In Column 5, Lines 11-12, delete " $\{k_l,n_l\}^L_{l-1}$ " and insert -- $\{k_l,n_l\}^L_{l=1}$ --, therefor.

In Column 5, Line 23, in Equation (1), delete " $\times X_j(k_l,n_l)+N_i(k_l,n_l), 1 \leq l \leq K,$ " and insert -- $\times X_j(k_l,n_l) + N_i(k_l,n_l), \quad 1 \leq l \leq L.$ --, therefor.

In Column 5, Line 39, delete " $\{Y_{i,j}(k_l,n_l)\}^L_{l=1}$ " and insert -- $\{Y_{i,j}(k_l,n_l)\}^L_{l=1}$ --, therefor.

In Column 6, Line 53, delete " $H_{i,j}(k_l,n_l)$ " and insert -- $H_{i,j}(k_l,n_l)$ --, therefor.

In Column 7, Lines 60-61, in Equation (9), delete " $\times \times [Y^*_{i,j}(k_m, n_l) -$ " and insert -- $\times [Y^*_{i,j}(k_m, n_l) -$ --, therefor.

In Column 9, Line 43, delete "TTI'S." and insert -- TTI's. --, therefor.

In the Claims:

In Column 12, Line 21, in Claim 14, delete "apparatus method" and insert -- apparatus --, therefor.

Signed and Sealed this  
Thirtieth Day of April, 2013

Teresa Stanek Rea  
*Acting Director of the United States Patent and Trademark Office*